United States Patent
Lev et al.

(10) Patent No.: US 7,924,553 B2
(45) Date of Patent: Apr. 12, 2011

(54) COMPUTER DEVICE LOCKING SYSTEM

(75) Inventors: Jeffrey A. Lev, Cypress, TX (US); Pablo J. Salazar, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/076,086

(22) Filed: Mar. 9, 2005

(65) Prior Publication Data

US 2006/0203437 A1  Sep. 14, 2006

(51) Int. Cl.
*H05K 7/16* (2006.01)
(52) U.S. Cl. ......... 361/679.06; 361/679.21; 361/679.26; 361/679.09; 248/921; 292/300
(58) Field of Classification Search .................. 361/681, 361/679.01, 679.02, 679.06, 679.07, 679.09, 361/679.21, 679.26; 248/917–924; 292/300, 292/DIG. 38
See application file for complete search history.

(56) References Cited

U.S. PATENT DOCUMENTS

| 5,335,142 | A | 8/1994 | Anderson |
| 6,707,665 | B2 | 3/2004 | Hsu et al. |
| 6,711,004 | B2 | 3/2004 | Yen et al. |
| 6,850,407 | B2 * | 2/2005 | Tanimoto et al. ............. 361/681 |
| 6,965,512 | B2 * | 11/2005 | Huang et al. .................. 361/683 |
| 7,133,280 | B2 | 11/2006 | Love |
| 7,242,385 | B2 * | 7/2007 | Kojo .............................. 345/156 |
| 2003/0090862 | A1 * | 5/2003 | Hsiang .......................... 361/681 |
| 2003/0223190 | A1 | 12/2003 | Hashimoto |
| 2004/0125583 | A1 | 7/2004 | Hsu et al. |
| 2004/0141284 | A1 * | 7/2004 | Chen et al. ..................... 361/681 |
| 2004/0228081 | A1 | 11/2004 | Lee |
| 2005/0047069 | A1 * | 3/2005 | Chu .............................. 361/681 |
| 2005/0087993 | A1 * | 4/2005 | Lin ................................ 292/45 |
| 2005/0207104 | A1 * | 9/2005 | Love ............................. 361/683 |
| 2006/0059749 | A1 * | 3/2006 | Wang et al. ................ 40/606.15 |

FOREIGN PATENT DOCUMENTS

| JP | 2004 318908 A | 11/2004 |
| JP | 2004318908 | 11/2004 |
| TW | M242743 | 3/1992 |
| TW | M251171 | 12/1992 |
| TW | M556876 | 1/2003 |

OTHER PUBLICATIONS

European Patent Office, Communication pursuant to Article 94(3) EPC, Appln. No. 06110034.3, date mailed Jan. 12, 2010, pp. 7.

\* cited by examiner

*Primary Examiner* — Jayprakash N Gandhi
*Assistant Examiner* — Ingrid Wright

(57) ABSTRACT

A locking system for a computer device comprising a display member coupled to a base member to enable positioning of the display member relative to the base member in a open position, a closed position and a tablet position. The system comprises a first locking mechanism adapted to restrict rotational movement between the base and display members in a direction about a first axis. The system also comprises a second locking mechanism adapted to restrict rotational movement between the base and display members in a direction about a second axis.

15 Claims, 6 Drawing Sheets

COMPUTER DEVICE LOCKING SYSTEM

BACKGROUND OF THE INVENTION

A convertible tablet computer system can be utilized in either a notebook mode or a slate or tablet mode by rotating and/or otherwise manipulating a position and orientation of a display member of the computer system relative to a base member of the computer system (e.g., generally via a multi-directional hinge assembly coupling the display member to the base member). However, because of the multidirectional hinge assembly, inadvertent and/or unwanted rotation of the display member relative to the base member tends to result (e.g., while the display member is positioned in the slate or tablet mode).

In some convertible computer systems, a latch is used to limit an/or otherwise restrict rotational movement of the display member relative to the base member. However, such latches are generally manually actuated, displeasing in appearance to the end user, and create difficulties for the user when writing on the display member particularly while in the tablet mode.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
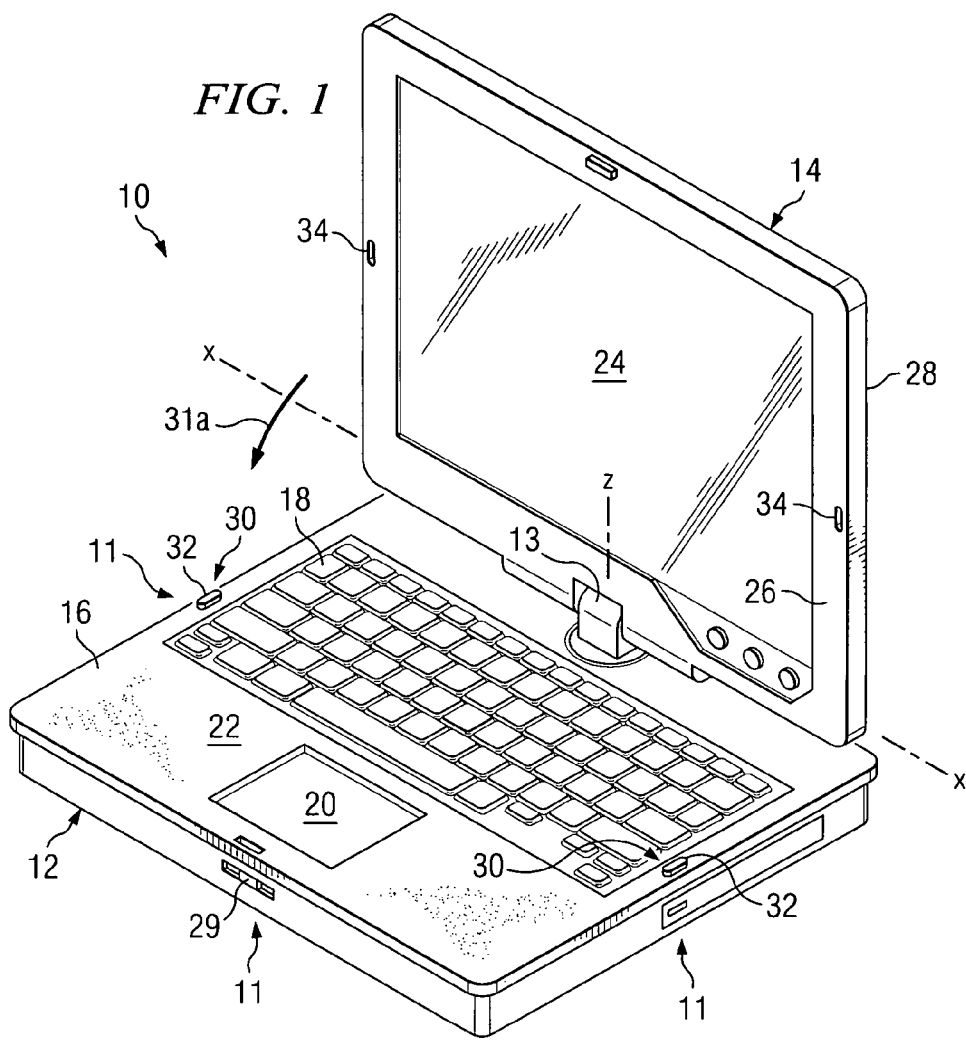
FIG. 1 is a front perspective view of a computer device in which embodiments of a computer device locking system in accordance with the present invention are employed to advantage.

The preferred embodiments of the present invention and the advantages thereof are best understood by referring to FIGS. 1-8B of the drawings, like numerals being used for like and corresponding parts of the various drawings.

FIGS. 1-6 are diagrams illustrating a computer device 10 in which an embodiment of a locking system 11 is employed to advantage. In the embodiment illustrated in FIG. 1, computer device 10 comprises a base member 12 and a display member 14 rotatably coupled together at a hinge 13. Hinge 13 enables display member 14 to rotate about a first axis X and a second axis Z. Base member 12 comprises a working surface 16 having a keyboard 18, a pointing device 20 and a wrist support 22. Display member 14 comprises a screen member 24 such as a liquid crystal display ("LCD"), a bezel 26 extending around a perimeter of screen member 24 and a cover 28.

Computer device 10 is operable among an open position (FIG. 1), wherein display member 14 is generally disposed in an upright position with respect to base member 12 (i.e., the notebook mode), a closed position (FIG. 2), wherein display member 14 is disposed adjacent to base member 12 so that cover 28, along with base member 12, protect working surface 16 and display member 14 during transport or storage, and a tablet position (FIG. 6), wherein display member 14 is configured so that cover 28 is adjacent to keyboard 18 and screen 24 remains exposed for use as a tablet personal computer (i.e., the tablet mode). Locking system 11 restricts relative movement between the base and display members about axis X and axis Z while in either the closed or tablet positions.

Figure 2:
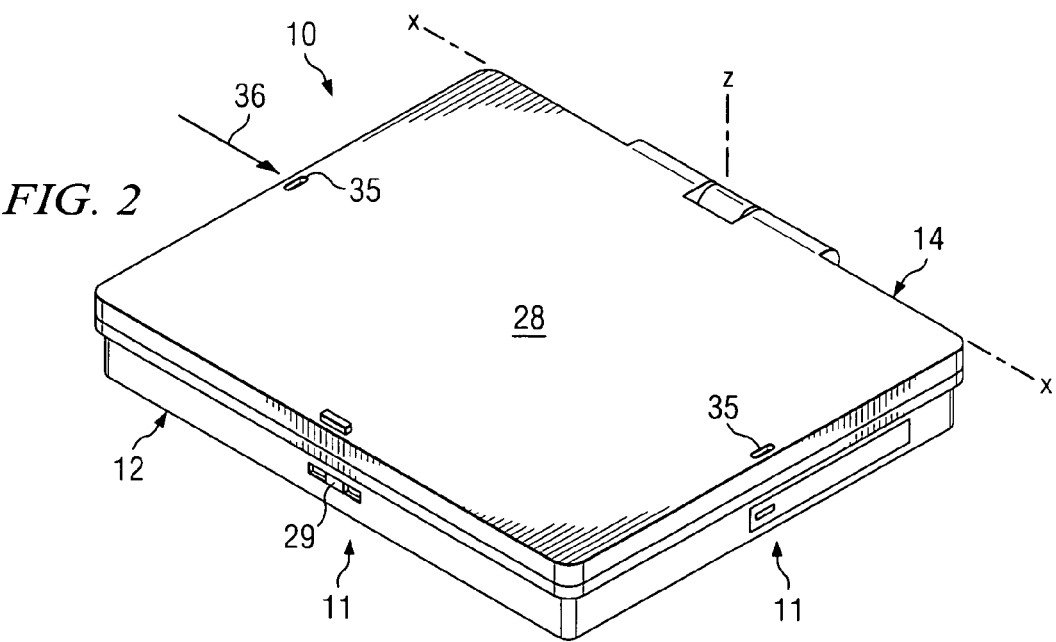
FIG. 2 is a front perspective view of the computer device of FIG. 1 in the closed position.

In the embodiment illustrated in FIGS. 1 and 2, locking system 11 comprises a first locking mechanism 29 such as a latch, to prevent display member 14 from rotating about first axis X relative to base member 12. In addition, locking system 11 comprises a second locking mechanism 30 for restricting movement of display member 14 about second axis Z while display member 14 is in the closed position. In the embodiment illustrated in FIGS. 1 and 2, locking mechanism 30 comprises ribs 32 disposed on working surface 16 and recesses 34 on bezel 26 that are aligned with and corresponding to each rib 32. Recesses 34 are sized to receive ribs 32 so as to restrict rotational movement of display member 14 with respect to base member 12 about second axis Z when computer device 10 is in the closed position (e.g., as illustrated in FIG. 2).

In operation, when transitioning computer device 10 from the open position (FIG. 1) to the closed position (FIG. 2), display member 14 is rotated in the direction of arrow 31a toward base member 12. During rotation, ribs 32 are automatically aligned with an inserted at least partially within recesses 34. Engagement of ribs 32 with recesses 34 while in the closed position resists forces applied to display member 14 relative to base member 12, or vice versa, in the direction generally indicated by arrow 36, which may otherwise cause inadvertent rotation of display member 14 relative to base member 12 because of the rotational characteristics of hinge 13.

Figure 3:
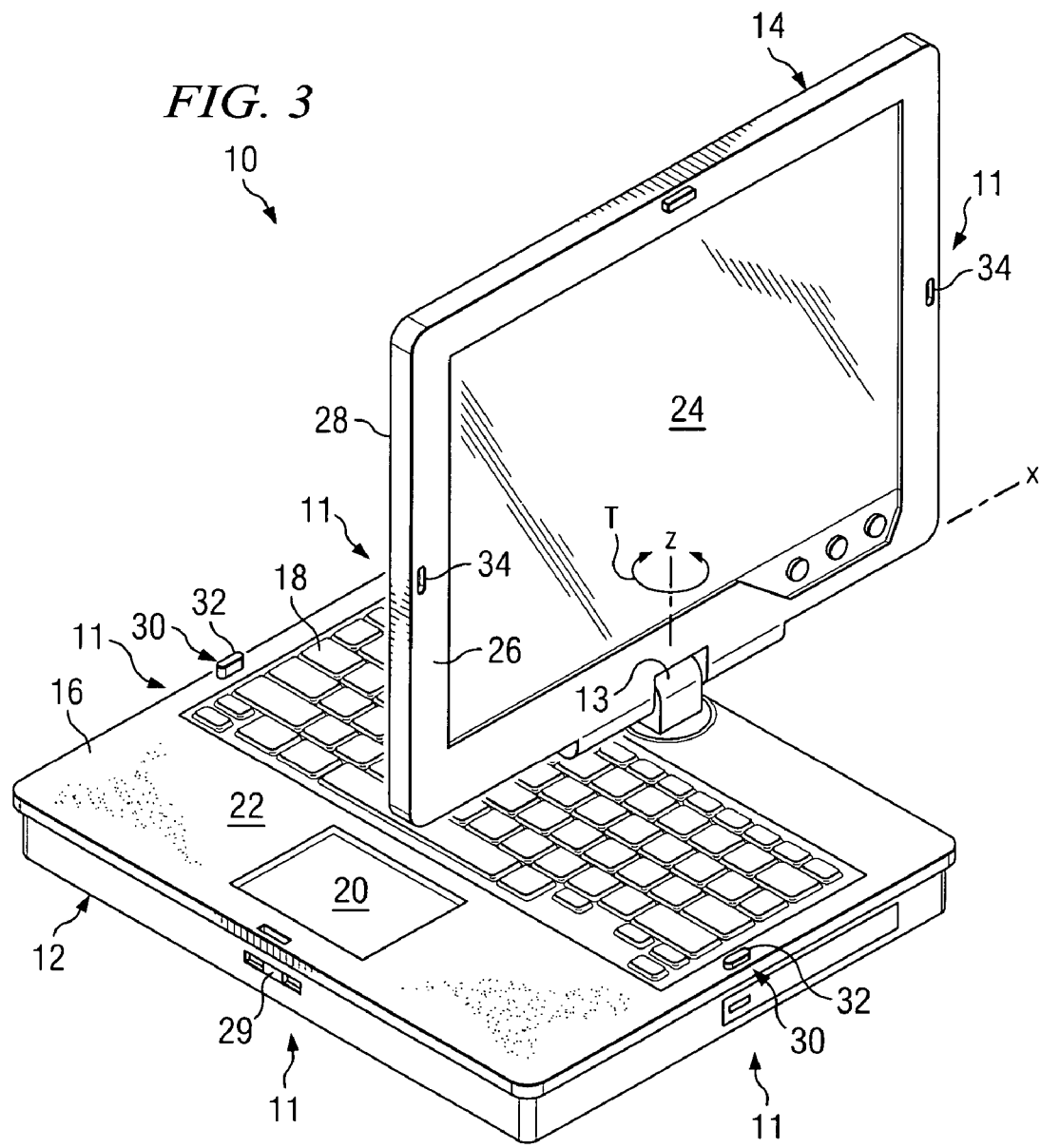
FIG. 3 is a front perspective view of the computer device of FIG. 1 with a display member thereof partially rotated.

FIG. 3 illustrates computer device 10 being partially transitioned from the open position to the to the tablet position. As illustrated in FIG. 3, display member 14 is rotated about axis Z in the direction of arrow T. Rotation of display member 14 continues until it is rotated 180 degrees from the open position, as illustrated FIG. 4.

Figure 4:
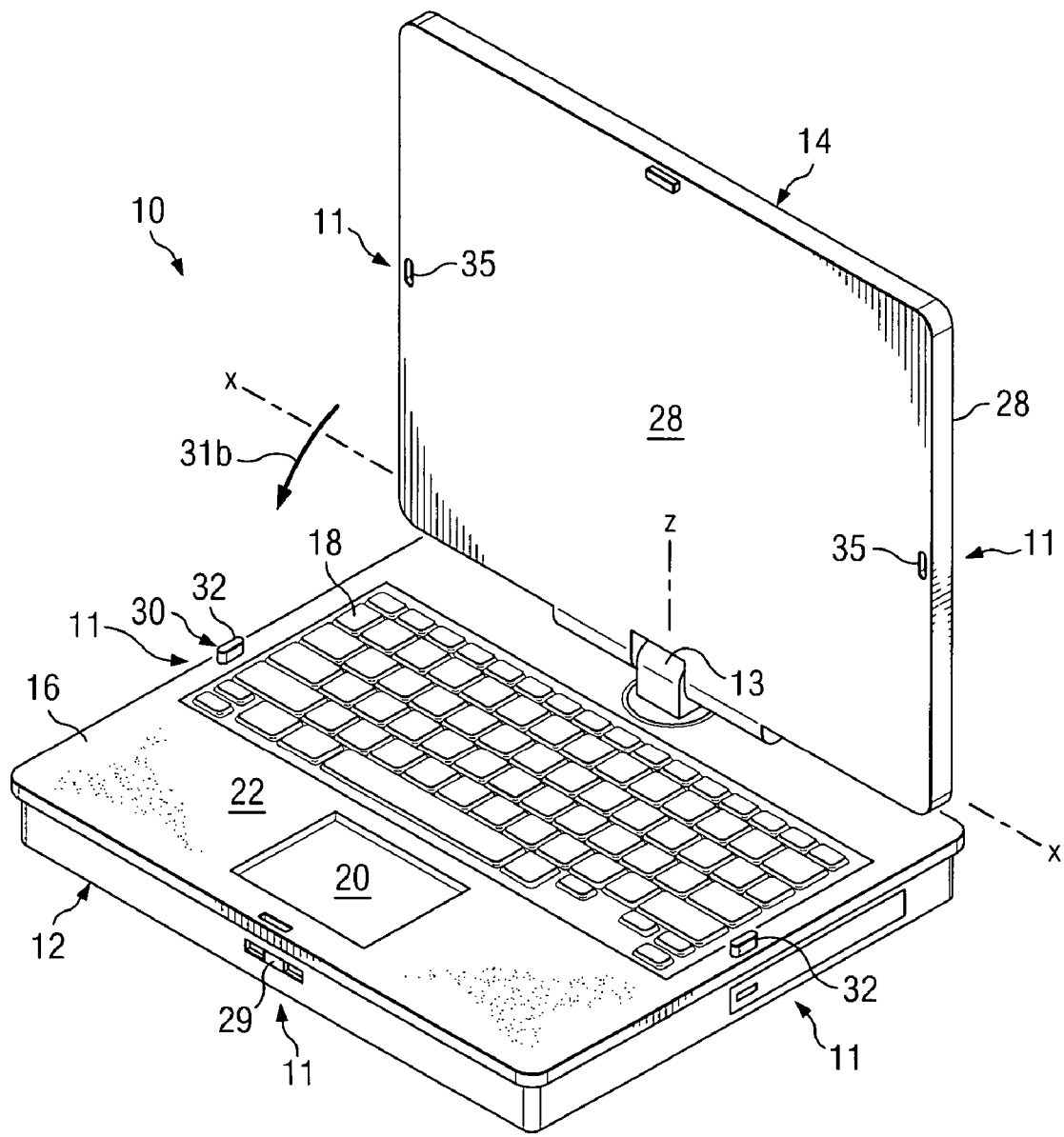
FIG. 4 is a front perspective view of the computer device of FIG. 1 with the display member rotated approximately 180 degrees from a position illustrated in FIG. 1.
Figure 5:
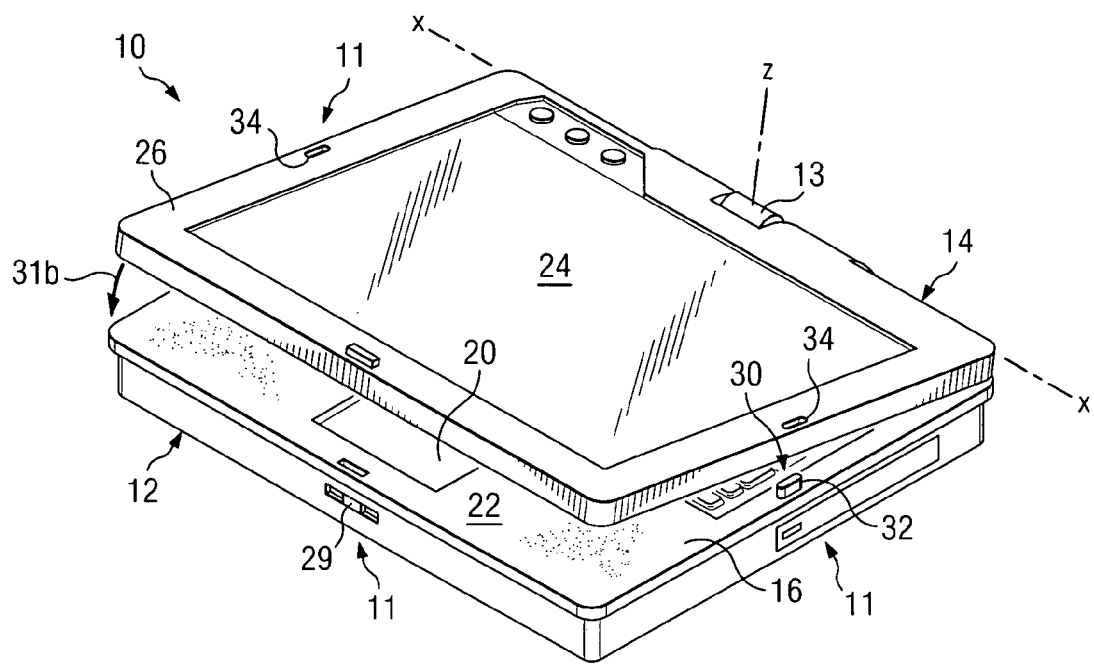
FIG. 5 is a front perspective view of the computer device of FIG. 1 being transitioned to the tablet position.

Referring to FIG. 4, cover 28 comprises recesses 35 that are sized to receive ribs 32. Accordingly, when computer device 10 is configured for use in the tablet position, ribs 32 are disposed at least partially within recesses 35 on cover 28 so that engagement of ribs 32 with recesses 35 prevent or substantially eliminate inadvertent rotation of display member 14 relative to base member 12 about the second axis Z, which may otherwise cause inadvertent rotation of base member 12 relative to display member 14 because of the rotational characteristics of hinge 13.

Figure 6:
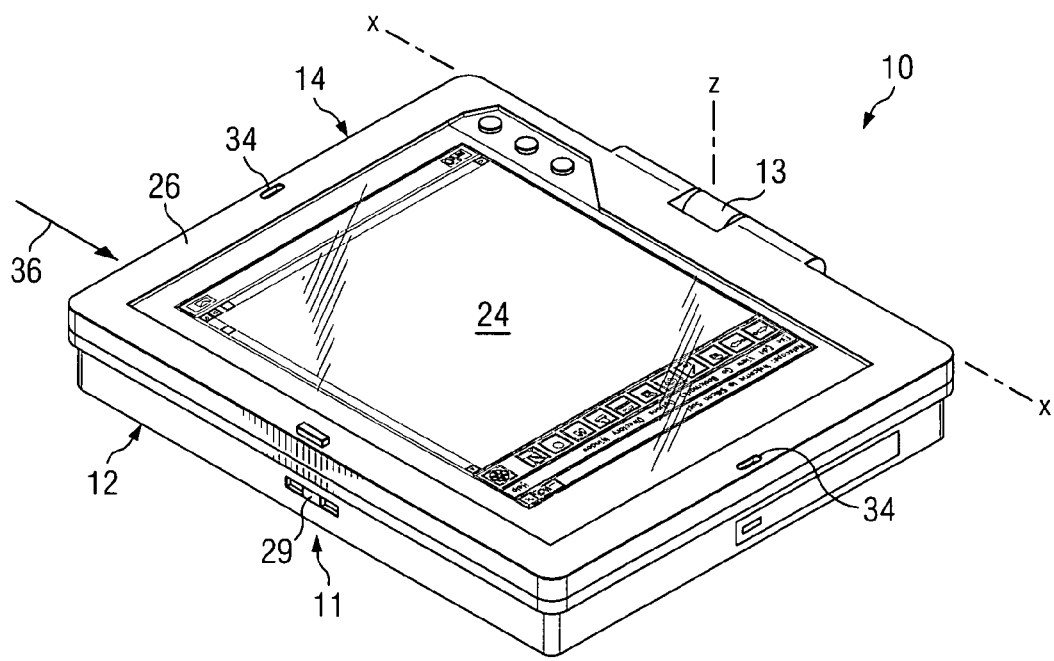
FIG. 6 is a front perspective view of the computer device of FIG. 1 in the tablet position.

As illustrated in FIGS. 3-6, when transitioning computer device 10 from an open position to the tablet position, display member 14 is rotated in the direction of arrow 31b about second axis X (FIG. 5) until ribs 32 are inserted at least partially within recesses 35 and display member 14 is positioned adjacent to base member 12 (FIG. 6). When the device 10 is in the tablet position, locking mechanism 29 securely fastens base member 12 to display member 14 to prevent rotation of display member 14 about axis X relative to base member 12. Furthermore, ribs 32 engage recesses 35 to prevent movement of display member 14 about second axis Z relative to base member 12. As such, ribs 32 resist forces applied to display member 14 relative to base member 12, or vice versa, in the direction generally indicated by arrow 36 (FIG. 6). It should be understood that the operations depicted in FIGS. 3-6 may be reversed and/or otherwise added to for changing the device 10 from a tablet position to a closed position, from a closed position to a tablet position, etc.

It should be understood that ribs 32 automatically engage recesses 34 and 35 when transitioning computer device 10 to and from the closed and tablet positions. Accordingly, no user interaction is necessary to restrict relative movement between base and display member 12 and 14 about axis Z (i.e., no required movement of additional hooks, tabs, latches, etc. by the user).

It should be understood that ribs 32 and recesses 34/35 can be formed having any complementary cross-sectional shape, such as oval, rectangular, square, triangular, etc., so long as ribs 32 can be inserted at least partially within corresponding recesses 34/35 to restrict movement of display member 14 with respect to base member 12. It should be further understood that a greater or fewer number of ribs 34 and/or recesses 34/35 may be used. While the embodiments illustrated in FIG. 1-6 illustrate two ribs 32 disposed on both sides of keyboard 18, it should be further understood that ribs 32 could be disposed at any other position on base member 12 so long as corresponding recesses 34/35 are aligned therewith.

Figure 7A:
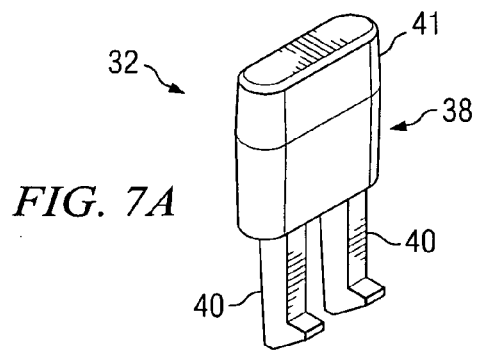
FIG. 7A is a front perspective view of an embodiment of a locking mechanism of the computer device illustrated in FIG. 1
Figure 7B:
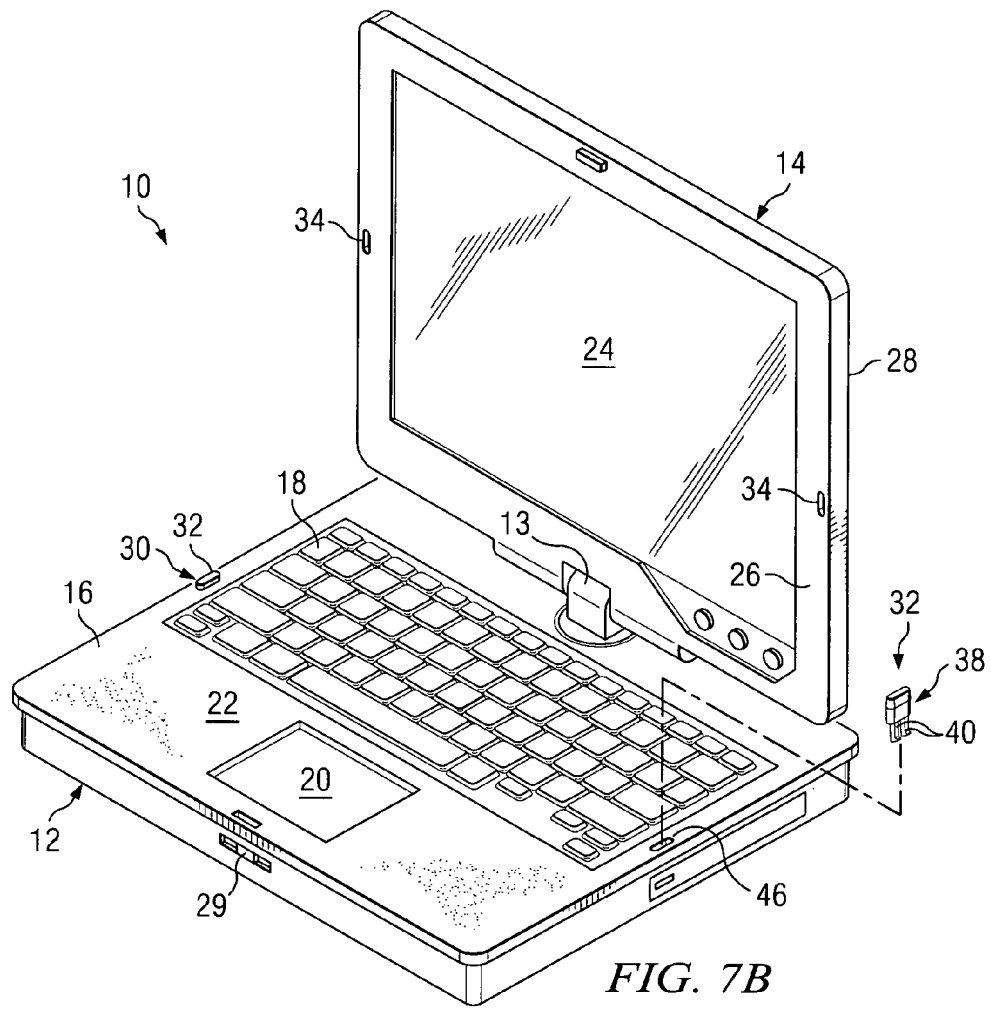
FIG. 7B is an exploded perspective view of the computer device illustrated in FIG. 1.

FIG. 7A is a diagram illustrating an embodiment of a rib 32 in accordance with the present invention. In the embodiment illustrated in FIG. 7A, rib 32 comprises a mounting mechanism 38 for attachment to base member 12. According to one embodiment of the present invention, mounting mechanism 38 comprises flexible hooks 40 to securely fasten rib 32 to base member 12 (e.g., by engaging corresponding structure within base member 12). It should be understood that a greater or fewer number of flexible hooks 40 can be used. In the embodiment illustrated in FIG. 7A, mounting mechanism 38 also comprises an extension portion 41 disposed on an opposite end from hooks 40. As illustrated in FIG. 7B, mechanism 38 is inserted inside a base member slot 46 such that hooks 40 engage base member 12 to securely fasten rib 32 to base member 12. When rib 32 is disposed within slot 42 and secured to base member 12, extension portion 41 of rib 32 protrudes from working surface 16 to facilitate engagement of rib 32 with corresponding recesses 34/35. It should be understood that other means of attachment can be used to securely fasten mechanism 38 to base member 12, such as by using an adhesive, screw or any other type of fastening mechanism.

Figure 8A:
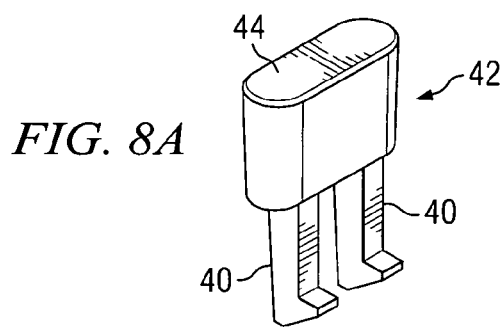
FIG. 8A is a front perspective view of an embodiment of mounting mechanism in accordance with the present invention.
Figure 8B:
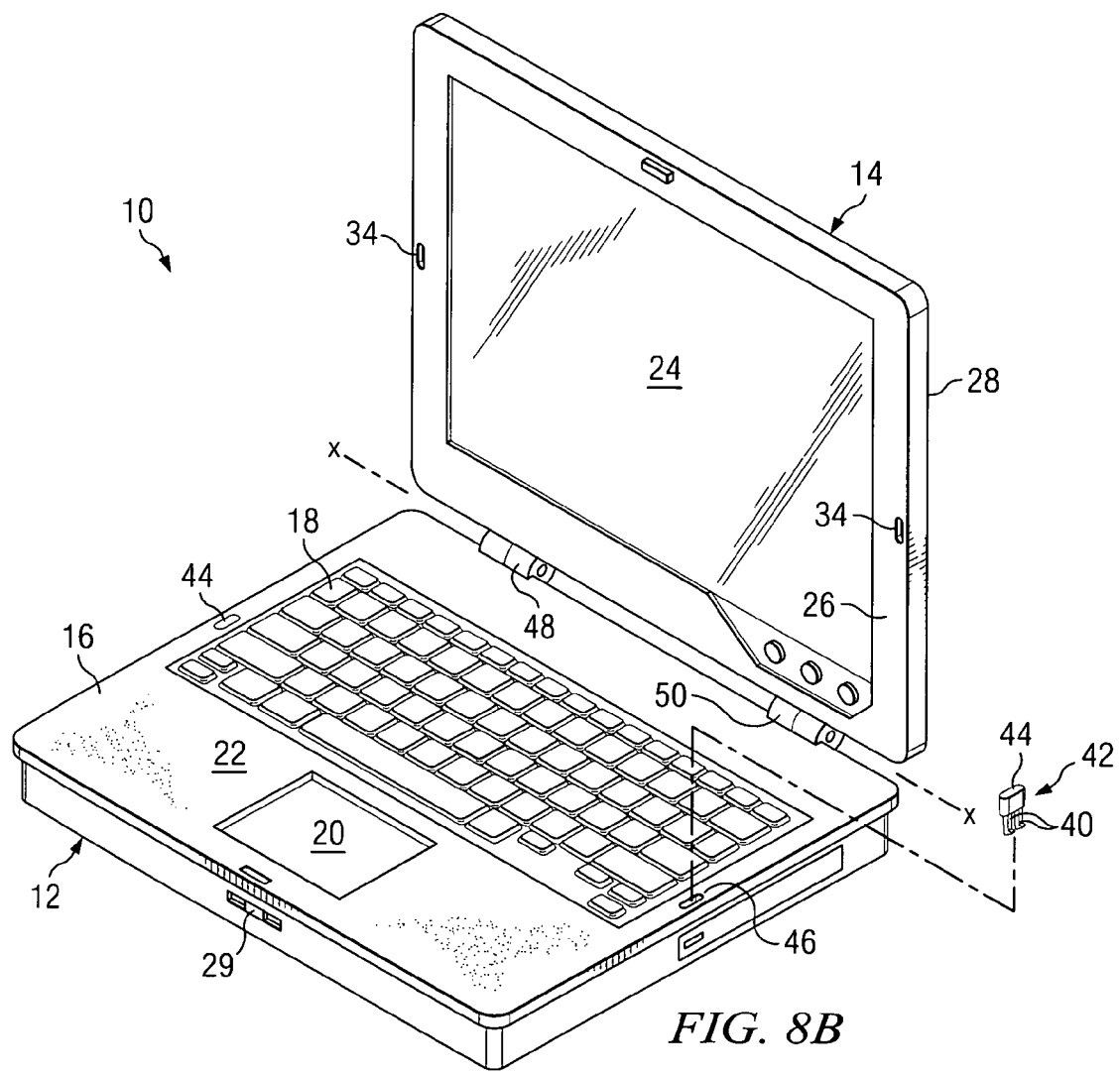
FIG. 8B is an exploded perspective view of another embodiment of a computer device in accordance with the present invention.

FIGS. 8A and 8B are diagrams illustrating a mounting mechanism 42 in accordance with the present invention. According to the embodiment of the present invention illustrated in FIGS. 8A and 8B, base member 12 is coupled to display member 14 via a dual hinge system 48 and 50 such that display member 14 is rotatable about first axis X only (i.e., device 10 is configured for notebook mode only). Accordingly, a portion of locking mechanism 30, namely, ribs 32, can be omitted from the embodiment illustrated in FIG. 7B and replaced with second mounting mechanism 42. Second mounting mechanism 42 comprises flexible hooks 40 to securely fasten second mechanism 42 to base member 12. In the embodiment illustrated in FIG. 8A, extension portion 41 is omitted such that mounting mechanism 42 comprises a planar surface 44 disposed on the opposite end of hooks 40. Mechanism 42 is configured having a height such that when mounting mechanism 42 is inserted within slot 40 and secured to base member 12, planar surface 44 of mechanism 42 rests flush with working surface 16. Accordingly, mounting mechanism 42 enables use of base member 12 in configurations designed solely for notebook mode while enabling the same base member 12 to be configured for tablet mode (e.g., by installation of rib 32 instead of mechanism 42). As such, the need to re-tool or design multiple types of base members 12 for different configurations of device 10 is not necessary.

It should be understood that in some embodiments of the present invention, ribs 32 can be integral with base member 12 (e.g., formed as a unitary or single structure). Furthermore, in addition to being disposed in base member 12, ribs 32 can be disposed on display member 14 with corresponding recesses 34 being disposed on base member 12.

Thus, embodiments of the present invention provide a computer device 10 having a locking mechanism 30 that prevents or substantially restricts rotation of display member 14 relative to base member 12 while in either the closed notebook or tablet positions. Furthermore, embodiments provide such locking function without user interaction. In addition, embodiments of the present invention provide an computer device having a base member 12 that can be utilized with different device 10 configurations (e.g., solely notebook, solely tablet, or a combination thereof).

What is claimed is:

1. A locking system for a computer device, comprising:
  a display member coupled to a base using a single hinge member to enable positioning of the display member relative to the base in a open position, a closed position and a tablet position;
  a first locking mechanism that is located at a first location on both the base and the display member and that restricts rotational movement between the base and the display member in a direction about a first axis through the single hinge member;
  a second locking mechanism that is located at a second location on both the base and the display member and that restricts rotational movement between the base and the display member in a direction about a second axis through the single hinge member; and
  wherein the second locking mechanism is automatically engaged and disengage in response to movement of the display member, and the first and second locations are at different locations on the base and the display member, wherein the second locking mechanism comprises one end with flexible hooks that engage a recess in the base and another end with a rib that engages a recess in the display member.

2. The computer device locking system of claim 1, wherein the first locking mechanism is automatically engaged in response to the display member positioned in the closed position, and the second locking mechanism is automatically engaged in response to the display member positioned in the tablet position.

3. The computer device locking system of claim 1 wherein at least part of the second locking mechanism is detachable from the base of the computer device.

4. The computer device locking system of claim 1 wherein the second locking mechanism comprises a rib removably couplable to the base and recesses on both sides of the display member.

5. The computer device locking system of claim 1 wherein the second locking mechanism includes a rib located on the base, a first recess located on one side of the display member, and a second recess located on another side of the display member, the first and second recesses being on opposite sides of the display member and aligning with each other.

6. The computer device locking system of claim 1 wherein the second locking mechanism comprises at least two ribs disposed on opposite sides of the base and at least four recesses located on opposite sides of the display member.

7. The computer device locking mechanism of claim 1 wherein the display member comprises a bezel, wherein the second locking mechanism comprises a rib and at least two recesses disposed on opposite sides of the bezel, the rib engages one of the two recesses in the closed position and engages another one of the two recesses in the tablet position.

8. The computer locking mechanism of claim 1 wherein the display member comprises a cover, wherein the second locking mechanism comprises at least two recesses disposed on the cover.

9. A method of manufacturing a computer device with a locking system, comprising:
  coupling a display member to a base using a single hinge member that positions the display member relative to the base in an open position, a closed position and a tablet position;
  providing a first locking mechanism that restricts rotational movement between the base and the display member in a direction about a first axis through the single hinge member; and
  providing a second locking mechanism that restricts rotational movement between the base and the display member in a direction about a second axis through the single hinge member, wherein the first locking mechanism is automatically engaged in response to movement of the display member to the closed position, the second locking mechanism is automatically engaged and disengaged in response to movement of the display member to the tablet position, and the first locking mechanism and the second locking mechanism are at different locations on the base and the display member, wherein the display member comprises a cover having at least two recesses on opposite sides of the display member, the two recesses aligning with each other to receive a rib that extends from the base.

10. The method of claim 9, wherein providing the first locking mechanism comprises providing a mechanism that automatically engages in response to the display member positioned in either the closed position or the tablet position.

11. The method of claim 9, wherein providing the second locking mechanism comprises one end with flexible hooks that engage a recess in the base and another end with a rib that engages a recess in the display member.

12. The method of claim 9, wherein providing the second locking mechanism comprises providing a rib removably couplable to the base and providing two recesses on opposite sides of the display member such that one of the two recesses engages the rib when the computer device is in the closed position and another of the two recesses engages the rib when the computer device is in the tablet position.

13. The method of claim 12, wherein providing a second locking mechanism comprises providing a recess on the display to engage the rib to restrict rotational movement between the base and the display member in the direction about the second axis.

14. The method of claim 9, wherein providing the second locking mechanism comprises providing at least two ribs disposed on opposite sides of the base and at least four recesses located on opposite sides of the display member.

15. The method of claim 9, wherein providing the display comprises a rib on the base and a bezel having at least two recesses disposed on opposite sides of the bezel, the rib engages one of the two recesses in the closed position and engages another one of the two recesses in the tablet position.

* * * * *